US008157645B1

(12) United States Patent
Kelly

(10) Patent No.: US 8,157,645 B1

(45) Date of Patent: Apr. 17, 2012

(54) SYSTEM AND METHOD FOR PROVIDING A BONUS WITH MULTIPLE REMOTE INPUTS

(75) Inventor: Bryan M. Kelly, Alamo, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 812 days.

(21) Appl. No.: 10/194,419

(22) Filed: Jul. 12, 2002

Related U.S. Application Data

(60) Provisional application No. 60/305,453, filed on Jul. 13, 2001.

(51) Int. Cl.
*A63F 9/24* (2006.01)
*A63F 13/00* (2006.01)

(52) U.S. Cl. .................. 463/27; 463/7; 463/16; 463/25; 463/42

(58) Field of Classification Search .................... 463/42, 463/16, 25, 29, 7, 27
See application file for complete search history.

(56) References Cited

U.S. PATENT DOCUMENTS 4,861,041 A 8/1989 Jones et al.
5,697,844 A * 12/1997 Von Kohorn .................... 463/40
5,803,451 A * 9/1998 Kelly et al. ............... 273/118 R
5,816,918 A * 10/1998 Kelly et al. ..................... 463/16
5,876,284 A * 3/1999 Acres et al. ...................... 463/25
5,923,252 A * 7/1999 Sizer et al. ................. 340/573.1
6,003,013 A * 12/1999 Boushy et al. .................. 705/10
6,626,758 B1 9/2003 Parham et al.

OTHER PUBLICATIONS

Fey, Slot Machines, A Pictorial History of the First 100 Years, Liberty Belle Books, 1983, pp. 214 & 215.*

* cited by examiner

*Primary Examiner* — Peter DungBa Vo
*Assistant Examiner* — Jasson Yoo
(74) *Attorney, Agent, or Firm* — TIPS Group

(57) ABSTRACT

An apparatus for providing a bonus system with remote inputs devices, where each remote device may have a purpose independent of the bonus machine. A bonus machine having a game of skill, a bonus, and a processor receives a message indicating the occurrence of an event. The message may be initiated by an event occurring at a game of skill or a remote device. Upon receiving the message, the bonus machine processes the message. The bonus is incremented for various events. If the event is achieving a task in the game of skill, the bonus is partially or completely rewarded to the player who achieved the task.

20 Claims, 11 Drawing Sheets

SYSTEM AND METHOD FOR PROVIDING A BONUS WITH MULTIPLE REMOTE INPUTS

CROSS REFERENCES RELATED TO APPLICATION

This application claims priority to provisional application U.S. Ser. No. 60/305,453 filed on Jul. 13, 2001 by Brian Kelly.

FIELD OF THE INVENTION

This invention relates generally to arcade and redemption games, and more particularly to systems and methods for providing a bonus system having multiple remote input devices.

BACKGROUND OF THE INVENTION

Arcade games have existed for many years. They are most common at amusement parks, arcades, and other entertainment centers. Many of these arcade games require a player to accomplish some task within a game of skill to earn a reward. The task is usually simple in theory but difficult enough to retain a player's interest through several attempts at playing the game.

With the development of computers and computer processing, entertainment centers have added video games and other forms of computer-based entertainment to their inventories. Despite this evolving trend, many arcades and entertainment centers have continued to offer arcade games for their game-playing customers. However, the video games have attracted many players away from playing traditional arcade games. Thus, continued profitability of arcade games requires that they possess characteristics that draw modern game players' interest and business.

The prior art discloses a system where multiple arcade games are networked together. As shown in FIG. 1, a system 10 for networking multiple arcade games includes a first player 11 playing a first arcade game 12, a second player 13 playing a second arcade game 14, and a networking apparatus 15 coupling the two games together. When the first player 11 and second player 13 are playing simultaneously, they are able to play against each other to accomplish a task or earn a reward. The networked system of the prior art usually allows players to compete against each other to accomplish a certain task within a game.

Another system disclosed in the prior art is a networked bonus system. As shown in FIG. 2, the bonus system 20 of the prior art discloses a first networked arcade game 21 with a first player 22, a second networked arcade game 23 with a second player 24, a network 25 for coupling the games to each other, and a bonus machine 26. The bonus is usually indicated on a display 27 that is visible to all players playing the networked arcade games. The bonus system 20 allows players to compete against each other as in the networked arcade game system 10 of FIG. 1. Additionally, the bonus system 20 allows players to earn a bonus reward. The value of the bonus is incremented when players accomplish tasks at their respective networked arcade games. If the task to earn the bonus is not completed by a player, the bonus amount remains for the next player to win. The bonus does not reset to zero upon a player beginning or playing a game. Any player playing a networked game may win the bonus at any time.

The prior art has several disadvantages. The networked arcade game system of FIG. 1 adds a competitive feature to the traditional arcade game in that players may play against each other. However, the game provides for only a limited reward and the zeal of competing against other players usually does not last long. With so many other options available in most arcades and entertainment centers, many players will not spend enough of their time or money on such a game. The bonus system in FIG. 2 provides for a large bonus to be awarded to the player who accomplishes a certain task or set of tasks. However, the bonus is generally incremented for tasks accomplished in each game. Thus, a large number of plays at the arcade games are required in order to accumulate a large bonus. This is undesirable because players may lose interest in playing the same game the number of times required to accumulate a large bonus. Further, bonus systems that entice players to play the arcade game enough times to accumulate a large bonus often draw those players away from other games in arcades and entertainment centers they reside in. Thus, in order to accumulate a large bonus on an arcade game, players must spend more time playing arcade games and less time playing other games. This corresponds to a decrease in business and profitability for the other games.

What is needed is an arcade game system that attracts players to play the arcade games, especially in environments having both arcade games and video game, while still encouraging players to play the other games.

SUMMARY

The present invention provides a system and method for providing a bonus system with multiple remote inputs. The invention allows users to increment a bonus by playing a bonus machine, by engaging remote devices in communication with the bonus machine, or by other methods. A player may win rewards, including the entire bonus, by playing the bonus machine. A preferred embodiment of the present invention take the form of an arcade game linked to various other devices around the arcade though a bonus system. These devices may be other games, vending machines or other features. Each time these peripheral devices are used, the reward increment for the arcade game increases. Thereby the value of the reward is not determined by the use of the arcade game alone.

A bonus system with multiple remote inputs in accordance with the present invention includes a bonus machine and at least one remote device that may transmit information. The bonus machine includes a game of skill, a processor, and a bonus. The game of skill allows a player to achieve a task and earn a reward. The processor has memory, is coupled to the game of skill, and is configured to receive information. The bonus is coupled to the processor and changes value upon the occurrence of certain events. The remote device may transmit information to the bonus machine's processor.

In one embodiment of the present invention, the bonus is affected by an event occurring at the bonus machine. Preferably, the event occurs at a game of skill located at the bonus machine. Upon receiving information indicating the occurrence of a particular event, such as a credit applied to the device, the bonus is incremented. Upon receiving information indicating the occurrence of another event, such as the achievement of a task in the game of skill, all or part of the bonus is awarded to the player achieving the task.

In another embodiment, the bonus is affected by an event occurring at a remote device. Preferably, an event is detected at a remote device, the remote device transmits information to the bonus machine, and the bonus is increased upon the bonus machine receiving the information. The event may be any type of event including when motion is detected or applying a credit to a device. In one embodiment, the information is transmitted as a serial data stream and may include channel identification information or device identification information. The device may be any device operable to have a countable event including a video game, vending machine, redemption game, motion detector, and timer. The information may be transmitted by any method, including discrete wires, RF transmission, a network, or an X10 standard system.

A method for providing a bonus with multiple remote inputs includes providing a bonus machine coupled to a game of skill, a processor, and a bonus, providing a remote device in communication with the bonus machine, communicating information to the processor in response to an event, and processing the information A player may achieve a task in the game of skill and earn all or a portion of the bonus. Both the game of skill and the remote device are operable to provide information to the bonus machine.

In one embodiment of the present invention, the event occurs at the bonus machine. The event may indicate the bonus is to be increased or decreased by awarding a portion or all of it to a player. In a preferred embodiment, the bonus is decreased if the event is a completed task in a game of skill. In yet another embodiment of the present invention, the event occurs at a remote device. The remote device then transmits information to the bonus machine and the bonus. In one embodiment, the bonus is incremented upon processing the transmitted information. The event may be the detection of motion, applying a credit to a device, the lapse of a period of time, or any other countable event. In one embodiment, communicating the information includes sending a serial data message. The serial data message may contain channel identification information and device identification information. Processing the message may include verifying the message. The device may be any device capable of having a countable event including a video game, redemption game, vending machine, motion detector, or timer. The message may be transferred by any means operable to transmit serial messages including RF transmission, discrete wires, an X10 standard system, or a network.

The bonus machine is incremented from events occurring at several different devices. This provides for a higher bonus, which is more likely to entice players to play the game at the bonus machine. The bonus machine encourages business at other games, machines, and devices by providing patrons a second chance to win credits that were spent at other machines. For example, if a user spends a token at a remote video game coupled to the bonus machine, the user may win the credit back if the user accomplishes a task at the bonus machine.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
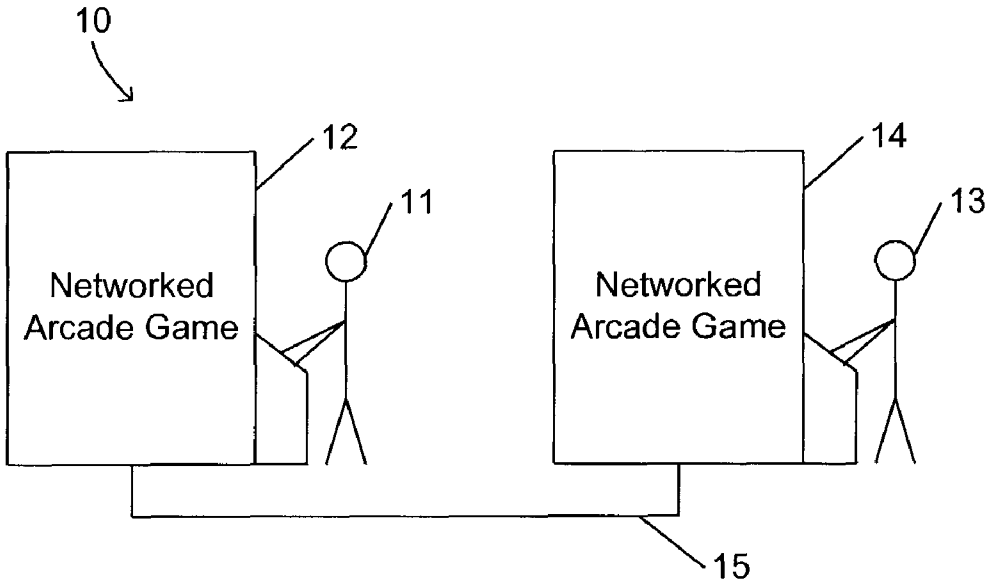
FIG. 1 (Prior Art)
FIG. 1 is a diagram of a networked arcade game system of the prior art.
Figure 2:
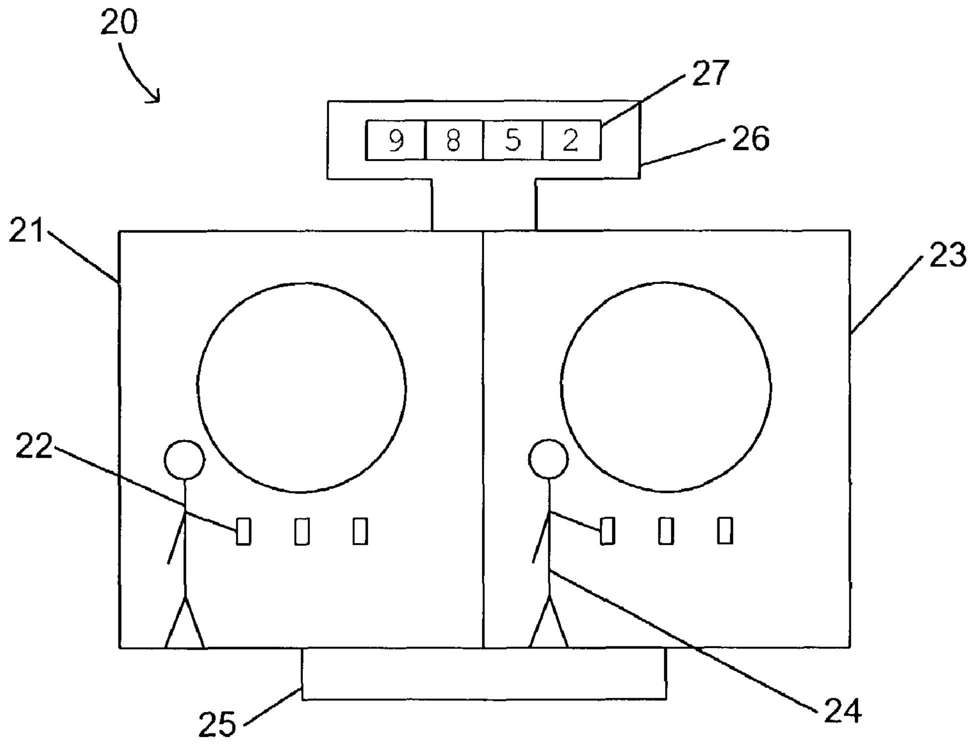
FIG. 2 (Prior Art)
FIG. 2 is a diagram of a networked bonus system of the prior art.
Figure 3:
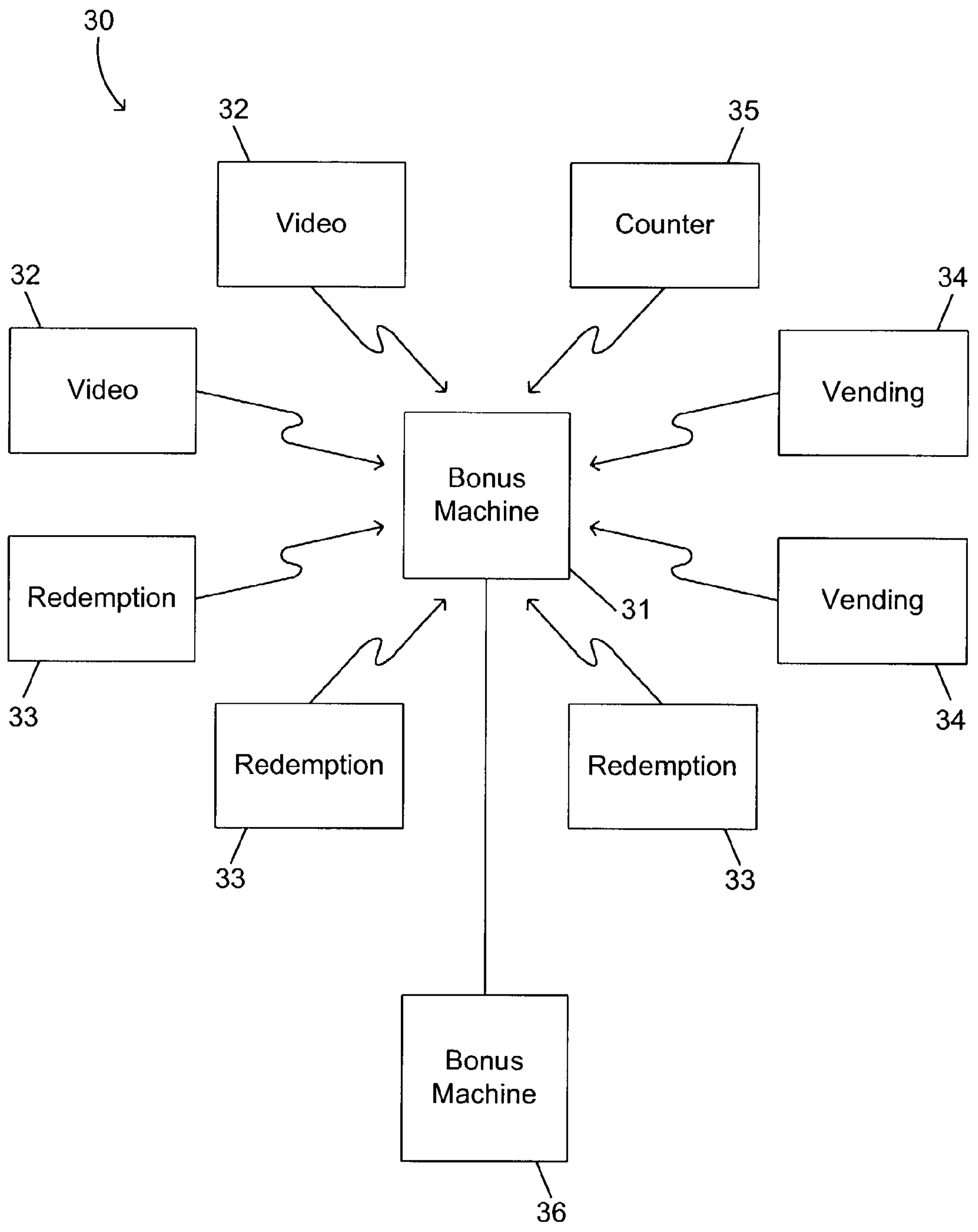
FIG. 3 is a diagram of a bonus system with multiple remote devices of the present invention.

FIGS. 1 and 2 were described in terms of the prior art. In FIG. 3, a bonus system 30 depicts a bonus machine with multiple inputs in accordance with the present invention. More particularly, a bonus system 30 of the present invention includes a bonus machine 31 and several remote devices 32-35. Each remote device is in communication with the bonus machine 31. In one embodiment of the present invention, the bonus system 30 also includes an additional bonus machine 36. The additional bonus machine 36 may only be in communication with the first bonus machine 31 as shown, or with the remote devices 32-35, or in communication with both the bonus machine 31 and the remote devices 32-35.

The remote devices 32-35 may be any type of machine or apparatus that is operable to provide a detectable event. Each device may have its own use and purpose independent of the bonus machine it is connected to. In one embodiment of the present invention, the devices may be machines that are commonly found in entertainment centers and arcades. In particular, the devices may be video games 32, redemption games 33, or vending machines 34. In a video game or redemption game, the detectable event may be a user achieving a task in the game. For a vending machine, the event may be a user purchasing a designated product. In a preferred embodiment, the detectable event for devices such as video games, redemption games, and vending machines is detecting a credit applied to the device. In a more preferred embodiment the credit applied to the device is a token inserted into an opening of the device.

In another embodiment of the invention, a counter 35 may be used as a remote device in communication with the bonus machine. Similar to remote devices 32-34, the counter 35 may be any device operable to provide a detectable event that occurs at the device. In one embodiment of the present invention, the counter 35 is a device such as a revolving door, admittance ticket counter, or other device for counting the number of patrons that enter a designated area. In another embodiment, the counter may monitor motion in some area, such as a designated area near a new or featured product. In yet another embodiment, the counter may be a timer that creates an event on a temporal basis. In this mode, the counter device may be a remote device as discussed above or implemented within the bonus machine. For example, the timer may create an event every minute. The time period required for an event to occur may be set by a user arbitrarily or according to some formula. For example, the counter may be set to produce an event corresponding to the average number of tokens spent per hour at an arcade, entertainment center, or other business the previous week. As appreciated by those skilled in the art, there are innumerable possibilities for utilizing a machine, counter, or other device to create a detectable event. All such possibilities are considered within the scope of the present invention.

The remote devices 32-35 may communicate with the bonus machine 31 in a variety of methods. In one embodiment of the present invention, a remote device sends a serial data stream to the bonus machine. The serial communication may be sent over discrete wires, a system using an X10 standard, a network, or an RF transmitter-receiver system. A communication system using discrete wires may utilize telephone lines or any other type of wire such that each remote device may transmit a signal to the bonus machine. A system using an X10 standard sends a serial signal over the power line wiring within a structure. Thus, the remote devices plugged into a power outlet could transmit to a bonus machine plugged into a power outlet though the power wiring within a building. An X10 communication system is useful in that no additional wiring is required. However, poor power line wiring at some locations would provide for poor quality signals. In a preferred embodiment, the communication from a remote device to the bonus machine is a serial data stream transmitted through RF transmission.

Figure 4:
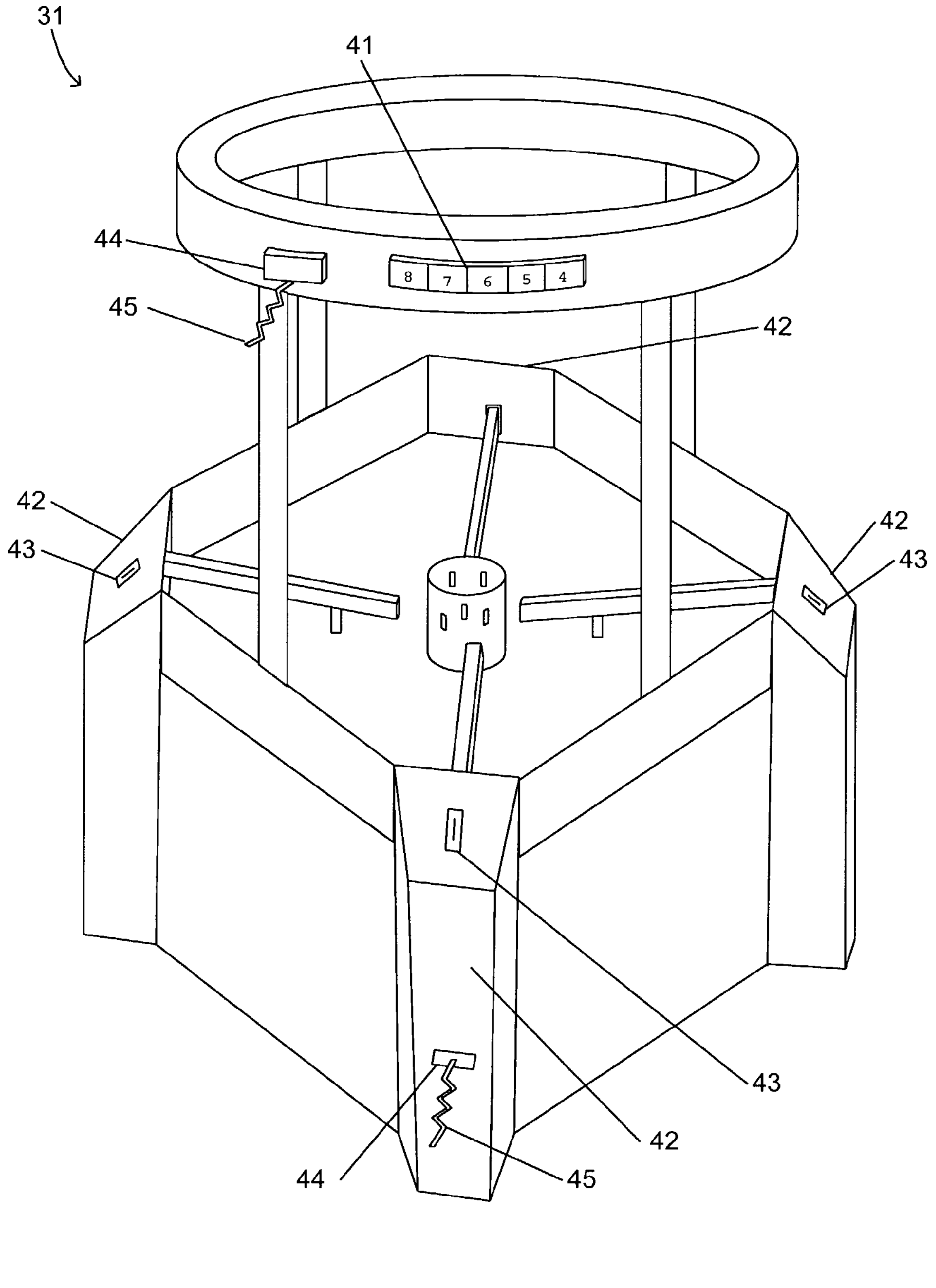
FIG. 4 is a diagram of the bonus machine according to one embodiment of the present invention.

FIG. 4 is an illustration of a bonus machine 31 in accordance with one embodiment of the present invention. As shown in FIG. 4, the bonus machine 31 includes a display 41, at least one game of skill 42, a credit apparatus 43, and a reward dispenser 44 that disperses a reward 45. The bonus machine also includes a computer having a processor and memory and operable to receive messages (not shown). In a preferred embodiment, a display 41 may be viewed from several angles. This may be achieved from a rotating display or multiple displays fixed to be viewed from different angles. The credit apparatus 43 may be any device for initiating or continuing a turn at the game of skill. The credit apparatus 43 may take the form of a coin slot, a magnetic-card slot, a push button, or any other device that allows a player to initiate or continue a game. Alternatively, the crediting apparatus 43 may be included within the game of skill 42, such as a game of skill that requires a player to roll a coin down a shoot and into a moving aperture. In such an embodiment of the invention, the coin insert portion of the game of skill is the crediting apparatus. The reward dispenser may be located in several locations on the bonus machine. In another embodiment, the reward dispenser is an indicator of an award earned and the actual reward dispenser is located at a remote location away from the bonus machine.

Figure 5:
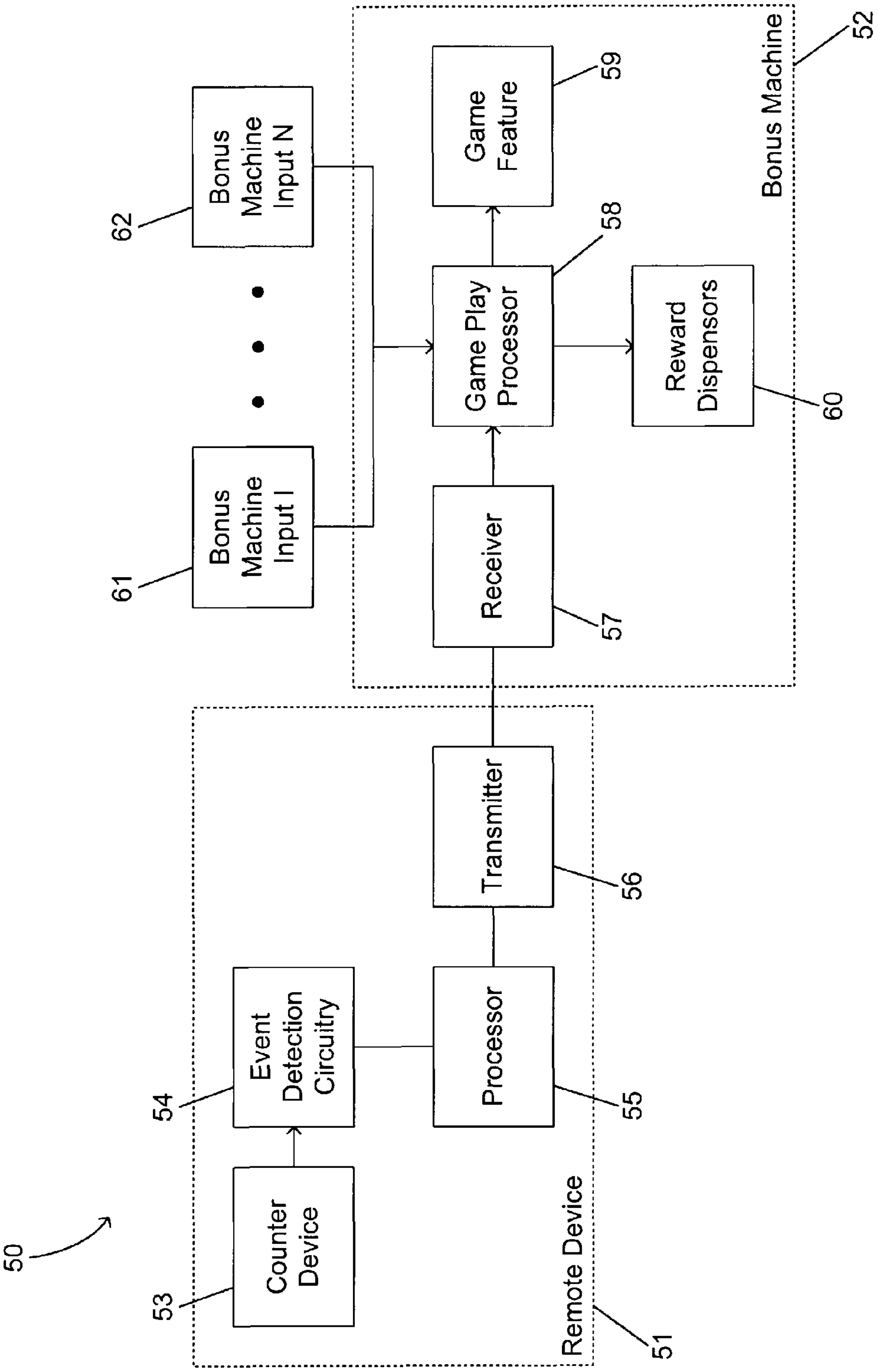
FIG. 5 is a block diagram of a bonus system having a remote device and a bonus machine in accordance with one embodiment of the present invention.

FIG. 5 is a block diagram of a bonus machine system 50 in one embodiment of the present invention. As shown in FIG. 5, the bonus machine system 50 includes a remote device 51 and a bonus machine 52. The remote device 51 may include a counter device 53 operable to create a countable event, event detection circuitry 54, a processor 55, and a transmitter 56. The bonus machine 52 may include a receiver 57, a game play processor 58, game features 59, and a reward dispenser 60. In one embodiment of the present invention, the bonus machine 52 may have several inputs 61-62 in addition to the remote device 51. The bonus machine inputs 61-62 may be from multiple games of skill on the bonus machine 52, multiple inputs from a single game of skill, or another bonus machine.

Figure 6:
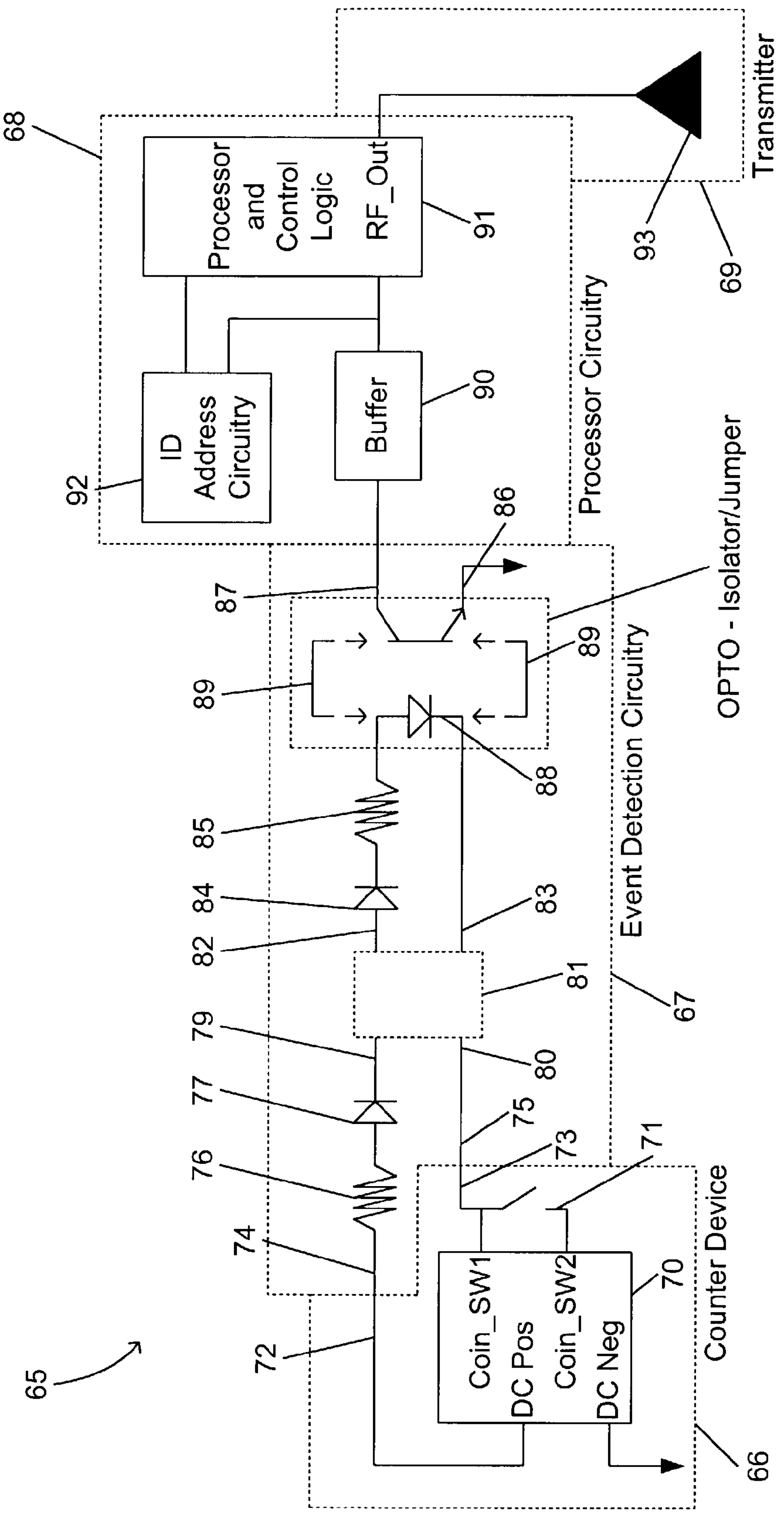
FIG. 6 is a block diagram of a remote device in accordance with one embodiment of the present invention.

FIG. 6 is a diagram of one embodiment of a remote device. As shown in FIG. 6, remote device 65 includes a counter device 66, event detection circuitry 67, processor circuitry 68, and a transmitter 69. In the embodiment shown, the counter device is a coin switch system 70. Additional circuitry within the counter device is not shown for simplicity reasons. The event detection circuitry 67 includes a first resistor 76, a first diode 77, a second diode 84, a second resistor 85, and a detection mechanism 88. One end 74 of resistor 76 is connected to the DC positive voltage terminal 72 of the counter device within the remote device. Diode 77 is connected to resistor 76. Terminal 75 of the event detection circuitry is connected to coin switch terminal 73 of the counter device.

Terminals 82 and 83 of the event detection circuitry may be connected to diode 77 and terminal 80 through connection system 81. Within the event detection circuitry, terminal 82 is connected to reverse protection diode 84, which in turn is connected to resistor 85. Resistor 85 and terminal 83 are then connected to terminals 87 and 86, respectively. In one embodiment of the invention, the connection is achieved by placing jumpers 89 between the resistor 85 and terminal 87 and between terminal 83 and terminal 86. In a preferred embodiment, this is achieved with an opto-isolation system 88 as shown. This is desirable in order to provide electrostatic discharge protection. The event detection circuitry is connected to the processor circuitry where terminal 87 is connected to buffer 90. Terminal 86 is connected to ground. Within the processor circuitry, buffer 90 is connected to a control logic system 91. Also connected to the control logic 91 is ID address circuitry 92. Finally, the control logic outputs a serial signal to the transmitter 93. In the embodiment shown, transmitter 69 is an RF transmitter 93. Obviously, FIG. 6 shows only one embodiment of the many ways in which a remote device may be used according to the present invention.

Figure 7:
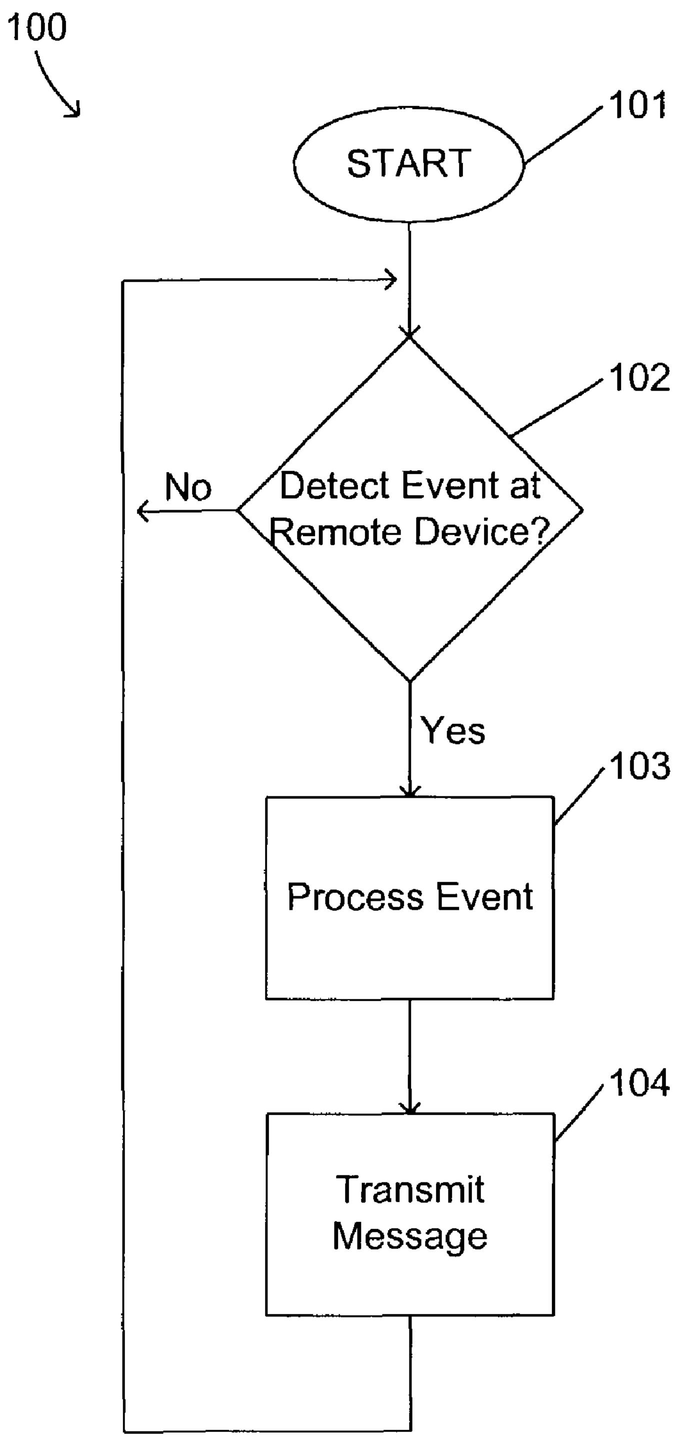
FIG. 7 is one embodiment of a flow diagram showing the operation of a remote device, in accordance with one embodiment of the present invention.

With reference to FIGS. 5 and 6, FIGS. 7-12 describe the operation of the bonus machine system. The flow diagram of FIG. 7 illustrates the operation 100 of a remote device, in accordance with one embodiment of the invention. The process starts with operation 101. An operation 102 determines if an event is detected. As discussed above, the event may be any number of detectable events. In the embodiment illustrated in FIG. 6, the event is the insertion of a coin into the remote device. Thus, when a coin or token is inserted into the remote device, the remote device circuitry closes switch 71, thus creating the 'event'. Operation 102 is carried out by event detection circuitry. FIG. 6 illustrates event detection circuitry 67 in one embodiment of the invention. A first portion of the event detection circuitry may be placed near the circuitry of the remote device involved with creating the event. In this embodiment, a second portion of the event detection circuitry and the processor circuitry may be separately located from a first portion of the event detection circuitry. Thus, a connection 81 is used to connect the first portion of the event detection circuitry to the second portion of the event detection circuitry. In one embodiment, the connection 81 is telephone wire. However, the connection 81 may be implemented in several ways to establish communication between the separate event detection circuitry and processor circuitry as will be appreciated by those of ordinary skill in the art. Further, though the event detection circuitry and processor circuitry may be implemented on more than one circuit board, both boards may be housed inside the remote device, such as a video game cabinet.

In one embodiment illustrated in FIG. 6, the detecting of the 'event' signal includes sending the event signal through reverse protection circuitry, such as diode 84, and into a buffer 90. In one embodiment, the signal is transmitted through jumpers 89. In a preferred embodiment, the signal is transmitted through an opto-isolation system, such as opto-isolator 88. The opto-isolator provides for the transfer of the event detection signal while isolating the processing circuitry from the counter device circuitry. If no event is detected, the process returns to step 102. If an event is detected, the event is processed in operation 103. The signal is received by buffer 90, which then sends the signal to the control logic and processor 91. The control logic and processor then create an output signal to be transmitted through transmitter 93.

In one embodiment of the present invention, the signal produced by the processor and control logic 91 is a serial data stream. The serial data stream is composed of several messages having several bytes. These bytes may include a channel identification byte, a byte code, a message identification byte, and a checksum byte. The channel identification code indicates what channel the remote device is transmitting a signal on. In one embodiment of the present invention, the channel identification byte is set by the ID address circuitry 92. The ID address circuitry 92 sends channel identification information to the control logic and processor 91 when enabled by a signal from the buffer 90. The processor and control logic 91 incorporate the ID address information provided by the ID address circuitry 92 into the serial data stream sent to transmitter 93. In a preferred embodiment, a user is able to select the channel ID by adjusting a DIP switch or similar device within the ID address circuitry 92.

The byte code portion of the message may contain data such as event information or machine identification. In a preferred embodiment, the byte code contains information indicating the bonus machine should be incremented. However, the byte code may also indicate identification information for the machine the event occurred at for event tracking purposes. The message identification byte is for ensuring a message is properly received by a bonus machine. In one embodiment, the message within the serial stream is sent from a remote device to a bonus machine several times to ensure the message is properly received. To avoid processing the same message more than once, the message identification byte provides identification information for the message sent. In one embodiment, a message is sent four times and the message identification byte indicates which of the four transmittals that particular message is. In another embodiment, the message identification byte is a random number identifying the message. In any case, if a message is processed before the last transmission of that message, the message identification byte enables the bonus machine to ignore subsequent transmissions of that message. Finally, a checksum byte is included for error detection. The checksum byte is usually placed at the end of a serial stream and indicates the addition of a previous number of bytes. In one embodiment of the present invention, the checksum indicates the sum of the previous three bytes.

After the event is processed in operation 103 of FIG. 7, the serial data stream is transmitted by the remote device in an operation 104. As discussed above, the transmission may be made by any means that provides for a serial data stream to be transmitted from a remote device. These methods include discrete wires, an X10 standard system, a network, or an RF transmitter. In one embodiment illustrated in FIG. 6, the transmitter is an RF frequency transmitter. In this embodiment, a transmitter is placed at each remote device and a receiver is placed at each bonus machine. The control logic and processor 91 send a serial stream to the transmitter 69. The transmitter 69 then transmits the serial signal as an RF transmission. In one embodiment, the transmitter sends the serial stream at 418 MHz. However, those skilled in the art will appreciate that the signal may be sent at different frequencies, or by using 418 MHz as a carrier frequency. The transmitter may be any generic RF transmitter. In a preferred embodiment, the transmitter is a Lynx type RF transmitter.

Figure 8:
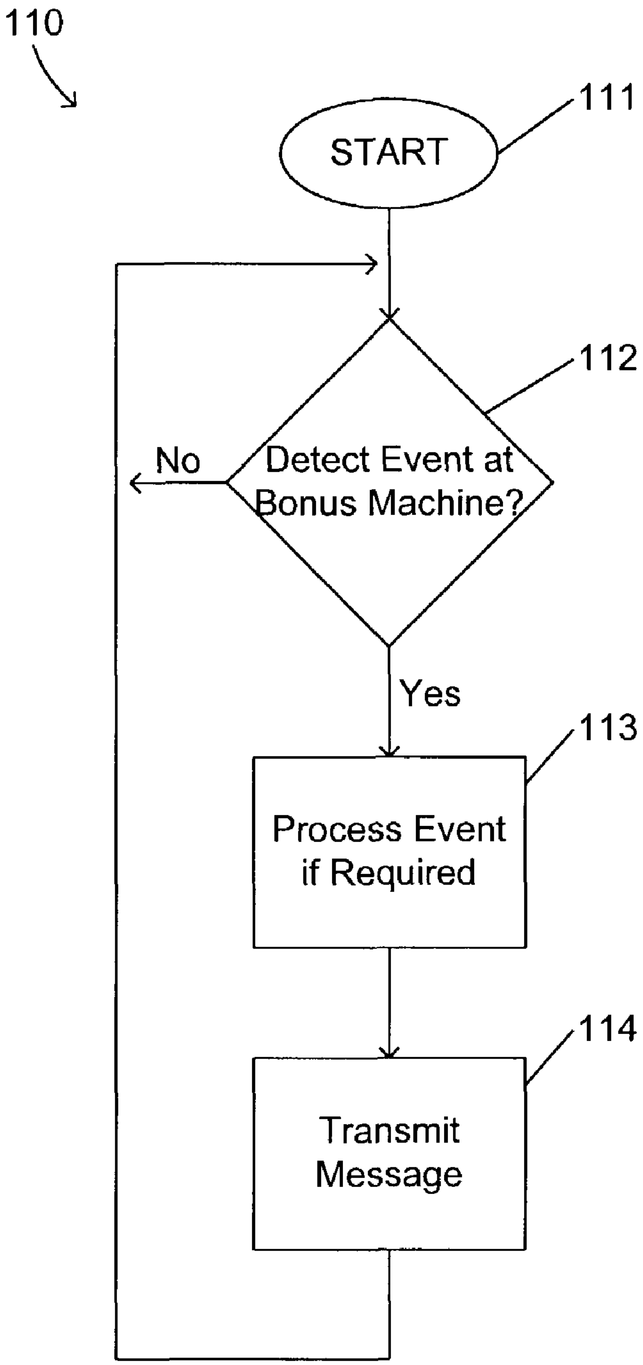
FIG. 8 is one embodiment of a flow diagram showing the operation of a bonus machine game, in accordance with one embodiment of the present invention.

FIG. 8 is a flow diagram showing the operation of a bonus machine game, in accordance with one embodiment of the present invention. The process 110 begins with a start operation 111. This may include power-up and initialization tasks that the bonus machine performs before play. In one embodiment of the present invention, this operation includes starting illuminated displays, motors, and moving parts that are part of the game of skill. Next, in an operation 112, the bonus machine determines whether an event has been detected. In one embodiment, the event may be achieving a task in a game of skill. In another embodiment, the event may be submitting a credit to the bonus machine. In a preferred embodiment, the task may require a user to place a playing piece into an aperture so that the playing piece performs a particular function. The function may require the playing piece to eventually proceed through another aperture or to make contact with a surface within the bonus machine. Thus, the event may be detecting when a playing piece enters the second aperture or makes contact with the surface. If no event is detected, the process returns to operation 112.

If an event is detected, the process proceeds to operation 113 where the event is processed. The games of skill on the bonus machine are operable to transmit a signal upon the occurrence of the event. In one embodiment, the games of skill send signals to an event processor that then sends a signal to a game play processor within the bonus machine. In this embodiment, upon receiving a message from a game of skill indicating an event has occurred, the event processor then determines whether the event calls for the bonus to be incremented, reduced, or some other function should occur. For example, the game of skill may require five tasks to be completed by a player. For each attempt at a task, the event processor may send an "increment bonus" signal to the game play processor. For each task completed, the event processor may send a "reward player" signal indicating that a portion of the bonus should be rewarded to a player. The size of the reward may depend on the difficulty of the task or the number of tasks completed thus far. If all five tasks are completed, the event processor may send a message indicating the entire bonus should be rewarded to the player who accomplished the tasks. In yet another embodiment, the games of skill send signals directly to the game play processor. In this embodiment, the message need not be processed before it is sent. This may be achieved by including event identification information within the event detection message indicating what event occurred or which task was completed. Alternatively, each event in a game of skill may have a separate input line to the game play processor within the bonus machine. Thus, if a bonus machine has four stations or games of skill, each having five tasks to complete, then the game play processor would receive a total of twenty separate inputs from the games of skill. This embodiment of the invention is illustrated in FIG. 5 with inputs 61-62, where N is 20. In a preferred embodiment, the event processor sends a 100 ms pulse if the bonus should be incremented and a 250 ms pulse if the bonus should be decreased.

Figure 9:
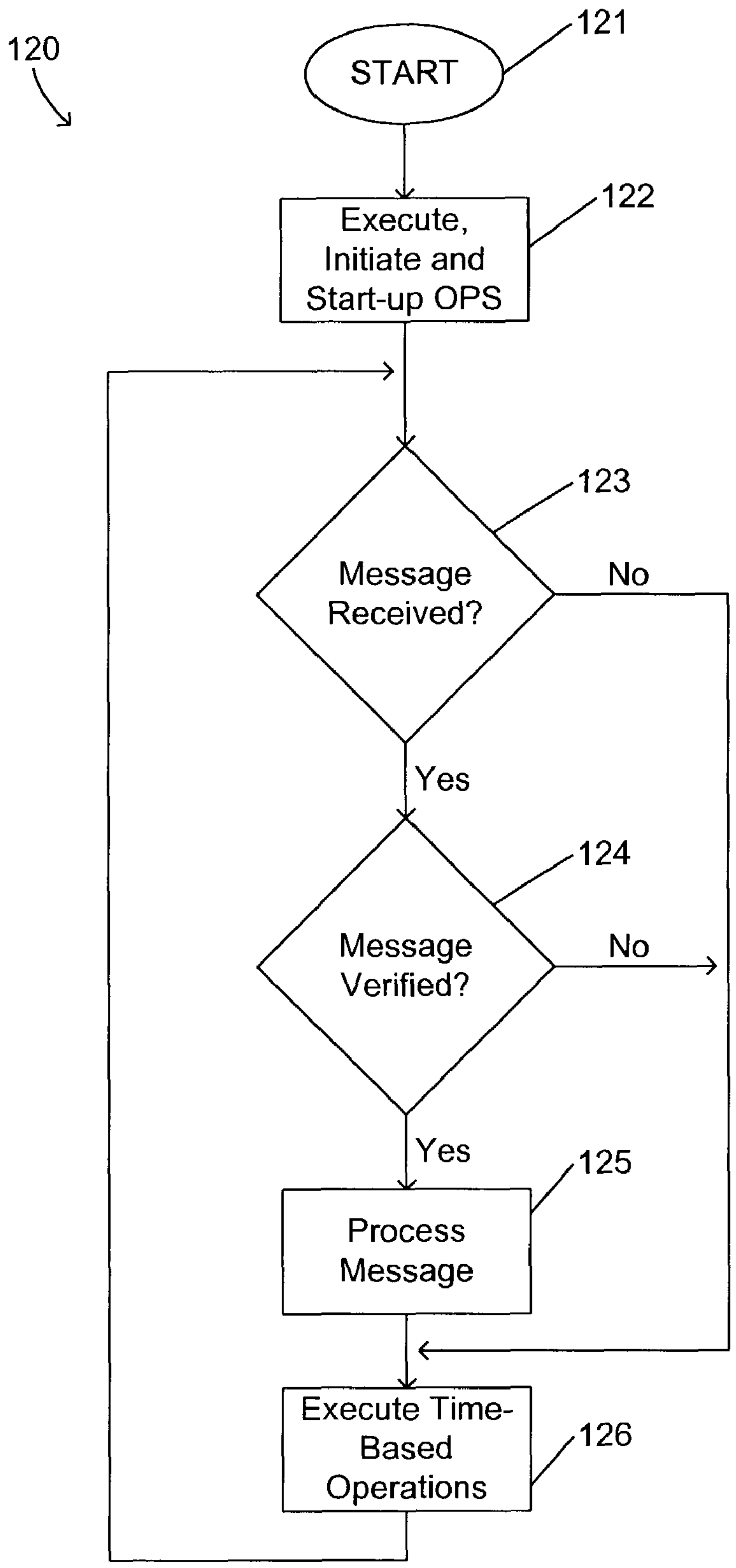
FIG. 9 is a flow diagram showing the operation of a bonus machine processor, in accordance with one embodiment of the present invention.

With reference to FIG. 5, the operation of the bonus machine game play processor 58 will now be discussed. FIG. 9 is a flow diagram illustrating the operation 120 of the game play processor. The process starts with operation 121. In an operation 122, the processor performs start-up and initialization functions. These may include initializing the game features, any reward dispensers controlled by the game play processor, loading registers within the game play processor, and other functions. Next, the processor determines if a message is received in operation 123. A message may be received from either a remote device or from a bonus machine input. If no message is received, the process then moves to operation 126 in order to execute time-based operations. If a message is received, the game play processor determines if the message can be verified in operation 124. If the game play processor is unable to verify the message, the message is ignored and the process moves to operation 126 in order to execute time based operations. If the received message can be verified in operation 125, then the message is processed in operation 125. After processing the message, the process continues to operation 126 so any time-based operations that require processing may be executed. After any required time based operations are completed in operation 126, the process returns to operation 123 to determine whether a new message has been received.

Figure 10:
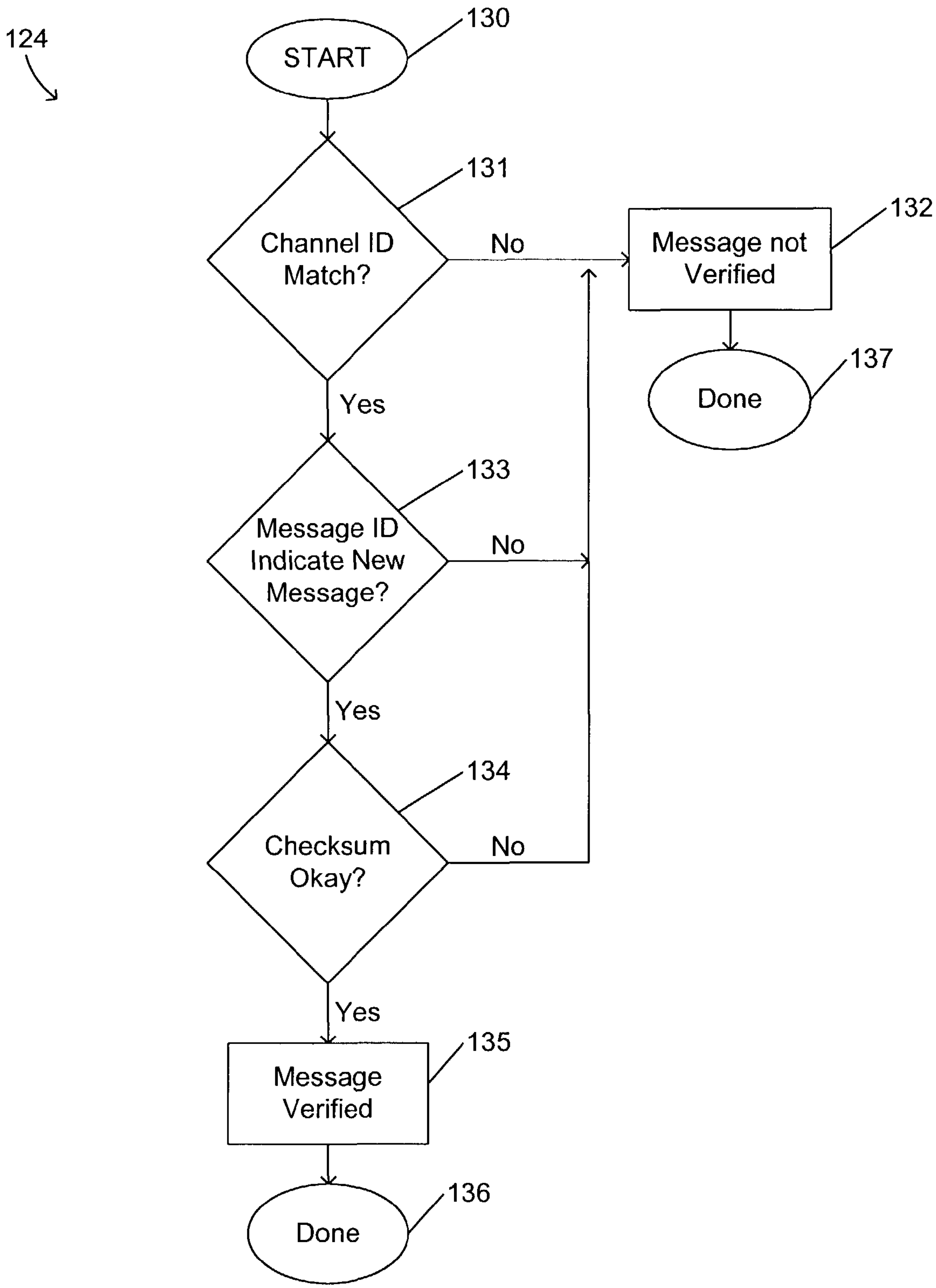
FIG. 10 is one embodiment of a one embodiment of flow diagram of the "MESSAGE RECEIVED" operation of FIG. 9.

FIG. 10 is a flow diagram illustrating the "message verification" operation 124 of FIG. 9 in more detail. The process starts with operation 130. Next, in operation 131 the game play processor determines whether or not the channel identification information in the message indicates the message should be received by that bonus machine. As discussed above, each remote device may indicate what channel a message is transmitted on. Accordingly, the receiver 57 in the bonus machine may be configured to accept messages from particular channels. Thus, if the game play processor determines the channel identification information in the transmitted message does not match a channel that the bonus machine is operable to receive messages from, the process continues to operation 132 where the message is considered not verified. If the channel identification information matches, the process proceeds to operation 133 to determine whether the message is a new or repeat message. As discussed above, a remote device may send a message more than once to ensure the message is properly received by the bonus machine. In one embodiment, message identification information within each message indicates whether the message is a repeat transmission or a new transmission. If the message is a repeat transmission and a previous transmission of that message has already been successfully received by the game play processor, then the process continues to operation 132 and the message is considered not verified. If the message is not a repeat message that has been successfully received by the game play processor previously, then the message verification process continues to operation 134 where a check sum is performed. A check sum process is a common error detection process as those skilled in the art will appreciate. In one embodiment of the present invention, the check sum operation 134 will determine whether a check sum byte within the message indicates the sum of the previous three bytes containing channel ID, message ID, and byte code information. If this is determined in the affirmative, then the message is verified and the message verification process is complete. If the check sum byte does not indicate the sum of the previous three bytes, then the process continues to operation 132 and the message is considered not verified. Upon the determination that the message is properly verified in operation 135 or not verified on operation 132, the message verification process 130 is complete for that particular message.

Figure 11:
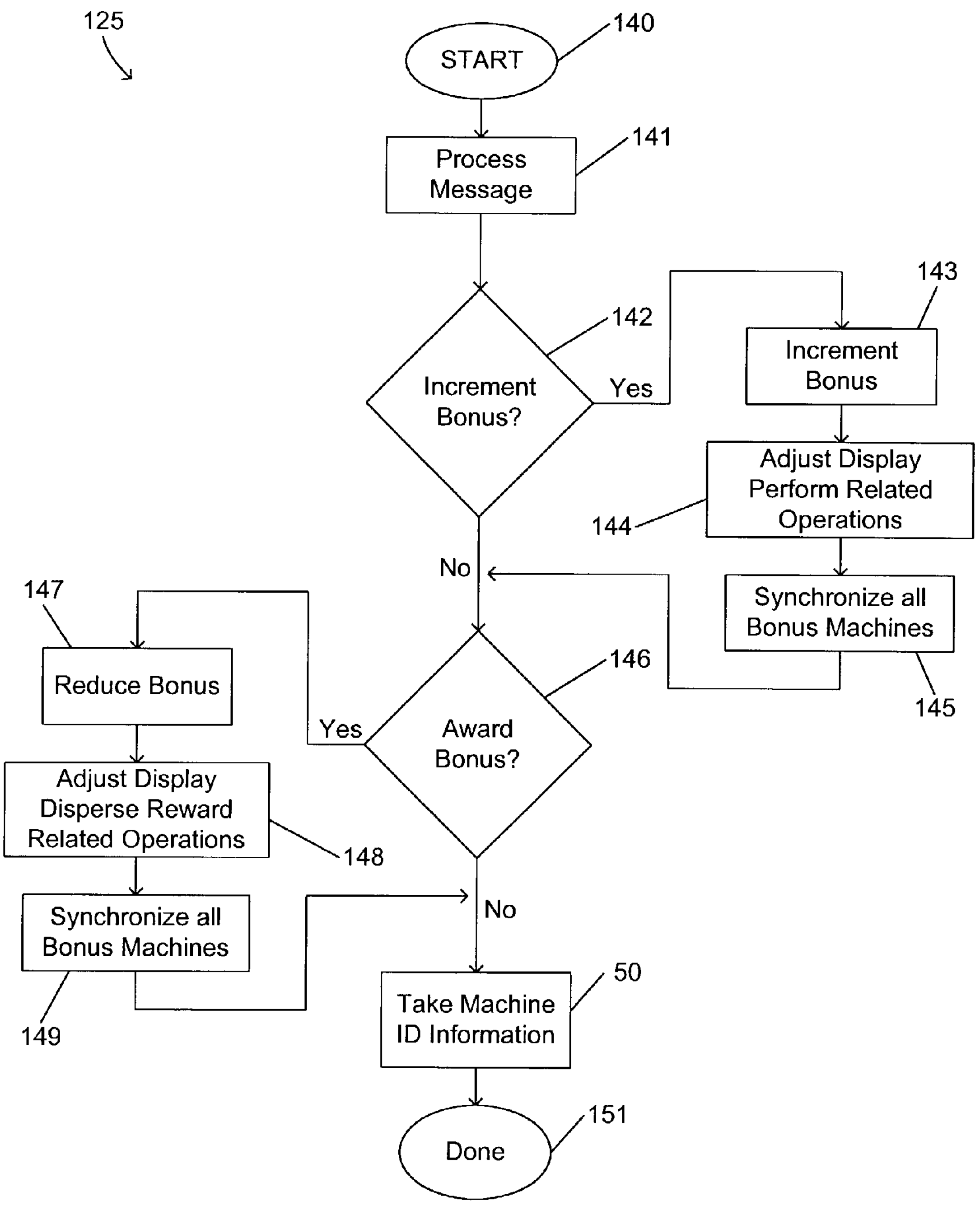
FIG. 11 is one embodiment of a flow diagram of the "PROCESS MESSAGE" operation of FIG. 9.

FIG. 11 is a flow diagram illustrating the "process message" operation 125 of FIG. 9 in more detail, in one embodiment of the present invention. The process starts with operation 140. Next, in operation 141 the game play processor processes a received message. In one embodiment, processing the received message includes loading the message into a register, retrieving a byte code portion of the message, and processing the byte code portion of the message. Next, in operation 142 the game play processor determines whether the bonus machine should be incremented. A message indicating the bonus machine should be incremented may originate from a remote device or a bonus machine. In one embodiment, a pulse of 100 ms indicates the bonus should be incremented. If the message indicates that the bonus machine should be incremented, the process continues to operation 143. In step 143, the bonus machine is incremented. Next, in operation 144, various operations are performed that accompany the bonus incrementing such as adjusting LED displays and other related operations. Next, in operation 145 any bonus machines connected to the present bonus machine are synchronized to display the same bonus as the present bonus machine. The process then continues to operation 146. If in operation 142 the game play processor determines the bonus machine should not be incremented, the process continues to operation 146.

In operation 146, the game play processor determines if the bonus amount should be reduced. In one embodiment of the present invention, the game play processor is reduced if a player completes a task or several tasks in a game of skill located at the bonus machine. In such case, a portion of the bonus or the entire bonus may be rewarded to a player for completing a task or group of tasks. In a preferred embodiment, a pulse of 250 ms indicates the bonus should be rewarded to a player at a particular game station. If the message indicates the bonus should be rewarded and decreased, the process continues to operation 147. In operation 147, the bonus is reduced. Next, in operation 148, the game play processor performs various operations associated with reducing the bonus and rewarding the player. In one embodiment of the invention, these operations include configuring the bonus machine electronic display and providing a reward. Then, in operation 149, the game play processor sends a synchronization message to any bonus machines that the rewarding bonus machine is connected to. This ensures that the bonus on all connected bonus machines is synchronized. The process then continues to operation 150. If the message indicates the bonus is not to be decreased in operation 146, then operation proceeds to operation 150.

In operation 150, the message may be processed further by the game play processor. In one embodiment, the processor extracts information from the message indicating what remote device transmitted the message. The processor may log the device at which the event occurred and the date and time the information was received. The processor may also extract other information related to the remote device or the event that occurred. Further, the processing of this information may occur at different stages in the process. Thus, as those skilled in the art will appreciate, the machine identification information need not be recorded only after the bonus machine is incremented or decreased. After the message processing is complete in operation 150, the process ends at operation 151.

Figure 12:
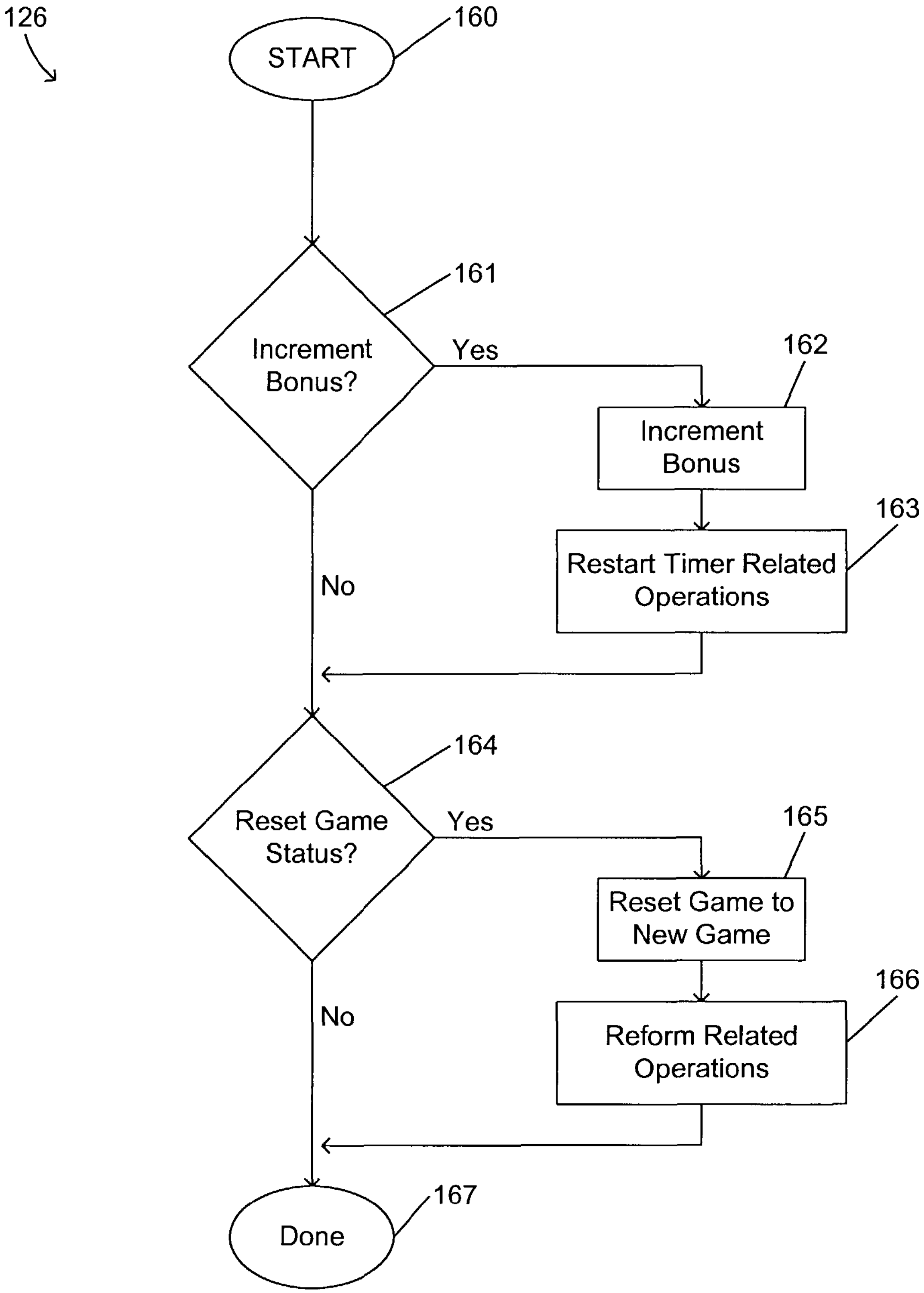
FIG. 12 is one embodiment of a flow diagram of the "EXECUTE TIME-BASED OPERATIONS" operation of FIG. 9.

FIG. 12 is a flow diagram illustrating the "execute time-based operations" step 126 of FIG. 9 in more detail, in one embodiment of the present invention. Time based operations may be processed and executed within operation 126, or at some other stage in the process 120 of FIG. 9. In one embodiment, the time based operations are processed by a secondary processor within the bonus machine. Thus, the secondary processor independently executes the time-based operations. The secondary processor may then signal the game play processor when a time based event occurs or proceed with to execute the appropriate operations itself. In another embodiment, the time based operations are executed by the game play processor. It is understood in the art that the process described herein is only one example of how time-based operations may be handled, whereby other such methods are considered within the scope of the present invention. The process starts with operation 160. In operation 161, the game play processor determines if the bonus machine should be incremented. In one embodiment of the present invention discussed above, the bonus machine may be set to increment the bonus on a strictly temporal basis. Thus, as discussed above, the bonus may be incremented every minute, every five minutes, or any other period of time. If it is determined that the bonus is to be incremented, then the process proceeds to operation 162. In operation 162, the bonus machine is incremented. In operation 163, the corresponding tasks and operations related to incrementing the bonus are performed, and any bonus machines connected to the incremented bonus machine are synchronized. Next the process proceeds to operation 164. If it is determined that the bonus need not be incremented, the process proceeds directly to operation 164.

In operation 164, the status of a player playing the bonus machine may be changed. In one embodiment of the present invention, a player must complete several tasks in a game of skill at the bonus machine to earn a portion or all of a bonus. For example, a player may be required to guide several playing pieces into separate apertures, one at a time. A first player may accomplish some of the required tasks, but not all of them. Thus, in order to prevent a second player from reaping a reward that the first player partially earned, the game play processor may is 'reset' the status of the game after a period of time has elapsed. This will help ensure that consecutive players achieve all the required tasks themselves and make earning the reward more difficult. Operation 164 determines if the status of the game should be reset. If the game play processor determines the play status should be reset, then the process proceeds to reset the game status in operation 165. In operation 166, the corresponding tasks and operations related to resetting the play status are performed. If the play status should not be reset, then the process proceeds to operation 167. Those skilled in the art will appreciate that the time based operations may be executed within the game play processor or by other processors in communication with the game play processor.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A system for providing a bonus with multiple remote inputs comprising:

a bonus machine wherein said bonus machine includes:

a game play processor, a receiver for receiving data from remote devices, and a bonus dispenser, and wherein the game play processor maintains a bonus counter which changes responsive to data from remote devices;

a first remote device, the first remote device including a game of skill, the first remote device including a transmitter coupled to the receiver of the bonus machine, the first remote device to transmit data related to events of the first remote device to the bonus machine, the first remote device physically remote from the bonus machine;

a second remote device, the second remote device having non-game functions only, the second remote device including a transmitter coupled to the receiver of the bonus machine, the second remote device to transmit data related to events of the second remote device to the bonus machine, the second remote device physically remote from the bonus machine;

wherein the bonus counter increments responsive to game events associated with the first remote device as indicated by data received from the first remote device, the game events being caused by users who interact with the first remote device in a first designated manner;

wherein the bonus counter increments responsive to non-game events associated with the second remote device as indicated by data received from the second remote device, the non-game events being caused by multiple different users who each interact with the second remote device in a second designated manner;

wherein the bonus counter maintains a bonus value which is awarded to the users of the first remote device responsive to events at the first remote device; and wherein the bonus counter changes responsive to events occurring at the bonus machine.

2. The system for providing a bonus with multiple remote inputs as claimed in claim 1, wherein the game of skill is played by a player in exchange for a monetary input provided by the player and the game of skill operable to transmit information to the game play processor upon occurrence of one of the game events, the game event resulting from interaction with the player.

3. The system for providing a bonus with multiple remote inputs as claimed in claim 1, wherein the game events occur at the first remote device, and a communication of information by the first remote device to the bonus machine is initiated by occurrence of at least one of the game events.

4. The system for providing a bonus with multiple remote inputs as claimed in claim 1, wherein the non-game events occur at the second remote device, and a communication of data by the second remote device to the bonus machine is initiated by occurrence of at least one of the non-game events.

5. The system for providing a bonus with multiple remote inputs as claimed in claim 4, wherein the non-game events are caused by motion of the multiple different users detected by a motion detection device in a pre-determined geographical location associated with the second remote device.

6. The system for providing a bonus with multiple remote inputs as claimed in claim 4, wherein the non-game events each include receipt of payment associated with the second remote device.

7. The system for providing a bonus with multiple remote inputs as claimed in claim 6, wherein the second remote device is a vending machine.

8. The system for providing a bonus with multiple remote inputs as claimed in claim 4, wherein the non-game events include receipt of a credit at the first remote device.

9. The system for providing a bonus with multiple remote inputs as claimed in claim 4, wherein the game events include activation of a bonus indicator at the first remote device.

10. The system for providing a bonus with multiple remote inputs as claimed in claim 4, wherein the bonus value is awarded responsive to events at the first remote device including a user winning a game at the first remote device.

11. The system for providing a bonus with multiple remote inputs as claimed in claim 1, wherein the events occurring at the bonus machine include at least one user achieving a task in a game of skill provided within the bonus machine and not in remote communication with the bonus machine.

12. The system for providing a bonus with multiple remote inputs as claimed in claim 11, wherein the second remote device includes a timer and the non-game events associated with the second remote device include a lapse of a period of time.

13. The system for providing a bonus with multiple remote inputs as claimed in claim 1, wherein a game of skill is implemented within the bonus machine, and wherein the game play processor controls game features of the game of skill implemented within the bonus machine in addition to the maintaining of the bonus value includes a game of skill.

14. A method for providing a bonus with multiple remote inputs comprising:

operating a first bonus machine having a bonus value, the first bonus machine also including at least one game of skill executed within the first bonus machine, wherein a player of the game of skill can achieve a task and earn a reward;

operating a first remote device in communication with the first bonus machine, the first remote device operable to provide information to the first bonus machine and having a purpose independent of the first bonus machine; and communicating information to the first bonus machine in response to events of the first remote device, the first remote device having a game of skill, the first remote device physically remote from the first bonus machine;

operating a second remote device in communication with the first bonus machine, the second remote device operable to provide information to the first bonus machine and having a purpose independent of the first bonus machine; the second remote device communicating information to the first bonus machine in response to events of the second remote device, the second remote device having only non-game functions, the second remote device physically remote from the first bonus machine;

receiving event information in the first bonus machine responsive to an event occurring in the first bonus machine, the event related to the game of skill implemented on the first bonus machine;

processing the information received from the first remote device and the second remote device and the first bonus machine at the first bonus machine;

incrementing the bonus value responsive to processing the information, including incrementing the bonus value for each of the events communicated to the first bonus machine from the first remote device and the second remote device and the first bonus machine;

wherein the bonus counter maintains a bonus value which is awarded to users of the first remote device responsive to events at the first remote device; and awarding a bonus represented by the bonus value at the first remote device responsive to information from the first remote device.

15. The method for providing a bonus with multiple remote inputs as claimed in claim 14, further comprising a second bonus machine in communication with the first bonus machine, the second bonus machine also in communication with the first remote device and the second remote device.

16. The method for providing a bonus with multiple remote inputs as claimed in claim 14, the second remote device is a vending machine.

17. The method for providing a bonus with multiple remote inputs as claimed in claim 14, the second remote device is a motion detector.

18. The method for providing a bonus with multiple remote inputs as claimed in claim 14, wherein the events of the second remote device are caused each time the second remote device is used in a designated manner by each of multiple users.

19. The method for providing a bonus with multiple remote inputs as claimed in claim 14, wherein the first bonus machine includes a game play processor controlling game features of the game of skill implemented on the bonus machine, and maintaining the bonus value.

20. A system for providing a bonus with multiple remote inputs comprising:

a bonus machine wherein said bonus machine includes:

a game play processor controlling game features of a game of skill implemented on the bonus machine and maintaining a bonus counter which changes responsive to data from remote devices, a receiver for receiving data from remote devices, and a bonus dispenser, a first remote device, the first remote device including a game of skill, the first remote device including a transmitter coupled to the receiver of the bonus machine, the first remote device to transmit data related to events of the first remote device to the bonus machine, the first remote device physically remote from the bonus machine;

a second remote device, the second remote device having non-game functions only, the second remote device including a transmitter coupled to the receiver of the bonus machine, the second remote device to transmit data related to events of the second remote device to the bonus machine, the second remote device physically remote from the bonus machine;

wherein the bonus counter increments responsive to game events associated with the first remote device as indicated by data received from the first remote device, the game events being caused by users who interact with the first remote device in a first designated manner;

wherein the bonus counter increments responsive to non-game events associated with the second remote device as indicated by data received from the second remote device, the non-game events and bonus counter increments being caused by multiple different users who each interact with the second remote device in a second designated manner;

wherein the bonus counter increments responsive to events associated with and occurring on the bonus machine; and wherein the bonus counter maintains a bonus value which is decreased at the bonus machine and awarded to a user of the bonus machine responsive to events at the bonus machine, the events at the bonus machine including the user of the bonus machine completing a designated task in the game of skill implemented on the bonus machine.

* * * * *